United States Patent
Levanoni et al.

(10) Patent No.: US 6,535,799 B2
(45) Date of Patent: Mar. 18, 2003

(54) DYNAMIC TECHNIQUE FOR USING CORRECTIVE ACTIONS ON VEHICLES UNDERGOING EXCESSIVE TURNS

(75) Inventors: Menachem Levanoni, Yorktown Heights, NY (US); Jerome M. Kurtzberg, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/845,647

(22) Filed: Apr. 30, 2001

(65) Prior Publication Data

US 2002/0161486 A1 Oct. 31, 2002

(51) Int. Cl.⁷ .................................................. G06F 7/00
(52) U.S. Cl. ............................... 701/1; 701/56; 701/59; 701/79; 701/110
(58) Field of Search ............................... 701/1, 33, 56, 701/57, 58, 59, 63, 65, 70, 79, 102, 110

(56) References Cited

U.S. PATENT DOCUMENTS

| 4,873,655 | A | * | 10/1989 | Kondraske | ................... | 702/86 |
| 5,168,272 | A | * | 12/1992 | Akashi et al. | ............... | 370/222 |
| 5,206,643 | A | * | 4/1993 | Eckelt | ..................... | 340/932.2 |
| 6,181,329 | B1 | * | 1/2001 | Stork et al. | ................. | 345/179 |
| 6,212,296 | B1 | * | 4/2001 | Stork et al. | ................. | 382/188 |

* cited by examiner

Primary Examiner—Gertrude Arthur
(74) Attorney, Agent, or Firm—Stephen C. Kaufman, Esq.; McGinn & Gibb, PLLC

(57) ABSTRACT

A method including providing force and acceleration sensors in a vehicle-enclosing device; transmitting data produced by the sensors during actual operation of the vehicle-enclosing device attached to a specific vehicle for subsequent analysis by a computer; and creating a force-and-acceleration map based on the sensor-based data.

11 Claims, 1 Drawing Sheet

DYNAMIC TECHNIQUE FOR USING CORRECTIVE ACTIONS ON VEHICLES UNDERGOING EXCESSIVE TURNS

BACKGROUND OF THE INVENTION

1. Field of the Invention

This invention relates to methodology for utilizing continual sensor-based data to design and adjust corrective actions on vehicles experiencing out-of-control-conditions, in a given dynamic environment, due to excessive turns.

2. Introduction to the Invention

Current techniques to control excessive turns rely on driver's skill and are not very effective. Automatic corrective actions techniques do not exist. Only static mechanical limitation of turning radius are in effect today. We note, here, that no attention is given to the dynamic workings of the vehicle in the changing real environment. Specifically, the stresses and accelerations experienced by the vehicle during normal operation are not taken into account, nor is an optimum balance, between safety and comfort, taken into account.

SUMMARY OF THE INVENTION

We have now discovered novel methodology for exploiting advantages inherent generally in sensing the dynamic workings (forces) on specific vehicles in actual motion, and using this sensor-based data to improve or optimize the construction and operation of corrective actions tools.

Our work proceeds in the following way.

We have recognized that a typical and important paradigm for presently controlling excessive turns, is a largely static and subjective human paradigm, and therefore exposed to all the vagaries and deficiencies otherwise attendant on static and human procedures. In sharp contrast, the novel paradigm we have in mind works in the following way.

First, a vehicle is equipped with a set of force and accelerations sensors mounted, say, inside a vehicle-encasing device (harness). These sensors record their associated forces and accelerations produced in normal vehicular motion in its dynamic environment for a prescribed period of time, preferably sufficient to capture all possible force and acceleration patterns.

The dynamically acquired data are fed into a computer which creates a map of the forces and accelerations experienced by the examined vehicle. This information may be used to design a preferably optimal set of corrective attitude jets which preferably maximizes support and minimizes discomfort, and result in a computer-based construction of said set of attitude jets that offers preferably optimal performance to the examined vehicle in its normal operation. This physical set of attitude jets preferably provides maximum safety, support and maximal comfort to its driver and passengers, following the optimal design of the corrective attitude jets.

Accordingly, we now disclose a novel computer method which can preserve the advantages inherent in the static approach, while minimizing the incompleteness and attendant static nature and subjectivities that otherwise inure in techniques heretofore used.

To this end, in a first aspect of the present invention, we disclose a novel computer method comprising the steps of:

i) mounting pressure and acceleration sensors in a vehicle-enclosing device;

ii) transmitting data produced by said sensors during actual operation of said body-enclosing device attached to a specific vehicle; and iii) creating a force-and-acceleration map based on said sensor-based data.

Preferably, the method includes a step for designing a model for a set of corrective attitude jets, optimal safety, support and comfort based on the force-and-acceleration map; and, preferably includes a further step of constructing a physical pressure-suit based on a design provided by the model.

BRIEF DESCRIPTION OF THE DRAWING

The invention is illustrated in the accompanying drawing, in which.

DETAILED DESCRIPTION OF THE PRESENT INVENTION

Figure 1:
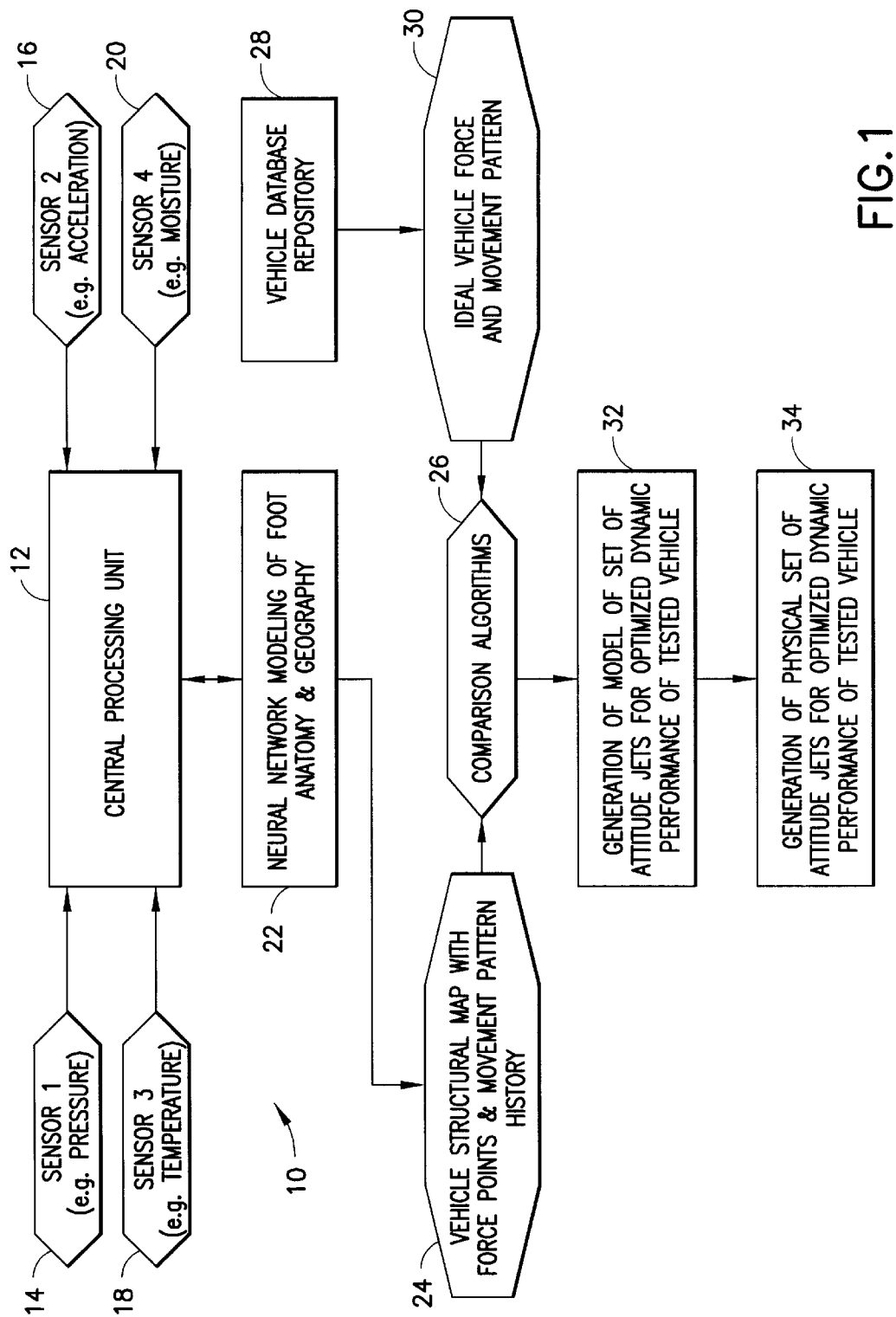
FIG. 1 provides an illustrative flowchart comprehending overall realization of the method of the present invention.

Attention is now directed to FIG. 1, which provides an overview flowchart (numerals 10–34) for typical and illustrative realization of the present invention.

In a typical case, a vehicle may be fitted with a temporary harness comprising a number of sensors (14, 16, 18, 20), located at prescribed locations on the tested vehicle. These sensors may include conventional force, acceleration, temperature, and/or humidity capabilities, and are preferably connected to a conventional recording device.

The harness fitted vehicle goes through its normal routine for several operational days. During the test period, sensor data are recorded (including time stamps) in the recording device. The suit and the recording device are returned at the end of the test period. The information stored in the recording device is then downloaded to a computer (12), which can store all data in a database.

The data are then analyzed by a program (preferably a neural network modeling program (22)), which can create maps of the tested vehicle at different times and road conditions. These maps also contain the sensors' reading at these times and conditions. Thus, this system now has information on the dynamic behavior of the tested vehicle, including parametric information.

Based on these maps, and maps of an ideal vehicle under similar conditions, an optimization program (32) designs an optimized set of attitude jets for the vehicle. This design is then fed to a system (34) which can generate an optimized physical set of attitude jets.

What is claimed:

1. A method for creating a model of an adjustable of corrective attitude jets for a vehicle, the method comprising:

i) providing acceleration sensors in a device attached to said vehicle, ii) transmitting data produced by said sensors during operation of said vehicle;

iii) creating a force-and-acceleration map based on said sensor-based data; and iv) creating a model of an adjustable set of corrective attitude jets for said vehicle based on said force-and-acceleration map.

2. A method according to claim 1, further comprising constructing a physical set of attitude jets based on a design provided by the model.

3. A method according to claim 1, comprising using a sensor elected from the group consisting of temperature, moisture, and road condition sensors, for correlating safety, support and comfort when using a physical set of attitude jets.

4. A method according to claim 1, further comprising using and interpolation technique to create said model.

5. A method according to claim 4, comprising a step of updating the model by using the interpolating map.

6. A method according to claim 5, further comprising optimizing said model.

7. A method according to claim 1, further comprising using a linear technique for creating said model of adjustable set of attitude jets.

8. A method as in claim 7, comprising a step of employing neural networks as the modeling technique.

9. A method according to claim 7, further comprising employing regression to model said set of attitude jets.

10. A method according to claim 7, comprising employing an expert system to model said set of attitude jets.

11. A program storage device readable by machine, tangibly embodying a program of instructions executable by the machine to perform a method for fitting a pressure suit to an individual, the method comprising:
- i) transmitting data produced by acceleration sensors provided in a vehicle-enclosing device during actual operation of said vehicle-enclosing device attached to an individual;
- ii) creating a force-and-acceleration map based on said sensor-based data; and
- iii) fitting a pressure suit to said individual based upon said force-and-acceleration map.

* * * * *